June 21, 1949.　　　　L. V. ROBINSON　　　　2,474,118
COMPRESSION TESTING APPARATUS
Filed Oct. 30, 1945　　　　　　　　　　　　2 Sheets-Sheet 1
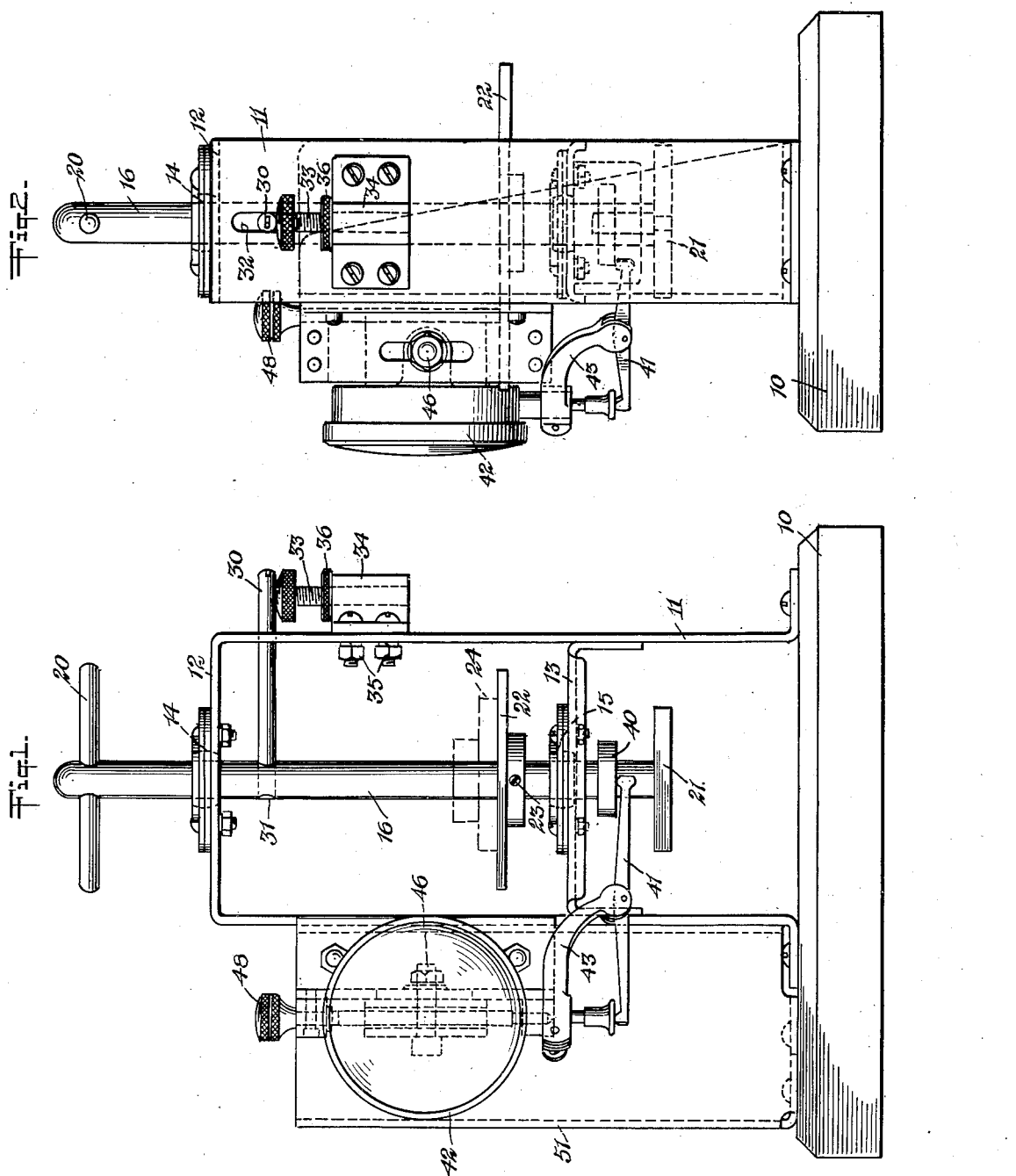
INVENTOR.
Leslie V. Robinson
BY
Munn, Liddy & Glaccum
Attorneys June 21, 1949.  L. V. ROBINSON  2,474,118
COMPRESSION TESTING APPARATUS Filed Oct. 30, 1945  2 Sheets-Sheet 2

INVENTOR.
Leslie V. Robinson
BY
Munn, Liddy, Glaccum
Attorneys

Patented June 21, 1949

2,474,118

UNITED STATES PATENT OFFICE 2,474,118

COMPRESSION TESTING APPARATUS

Leslie V. Robinson, New York, N. Y., assignor to Robinson Aviation, Inc., New York, N. Y.

Application October 30, 1945, Serial No. 625,596

2 Claims. (Cl. 73—94)

This invention relates to compression indicators.

It is an improvement over the invention shown in Patent No. 2,376,814 issued to me on May 22, 1945.

The principal object of the invention is the provision of an instrument for rapid, accurate measurement of the resistance to compression of such materials as sponge rubber, plastic sponge and similar articles. It is a simple device, very simply operated, but of highest accuracy. Its use in connection with vibration absorbing substances used to support vibrating units in combat and other airplanes employed by the United Nations during World War II has been productive of very gratifying results.

A preferred embodiment of this invention is shown in the accompanying drawing in which—

Fig. 1 is a front view of the device;

Fig. 2 is a side view thereof;

Figure 3:
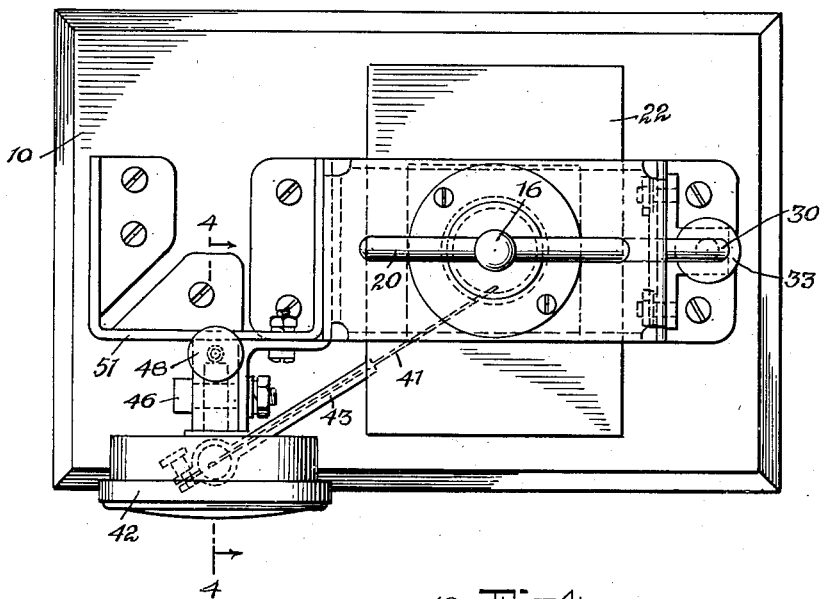
Fig. 3 is a top view of the same device.

The compression instrument herein claimed includes a base 10 and a frame 11 mounted thereon. The frame includes a pair of cross members 12 and 13, respectively, which carry a pair of bushings 14 and 15, respectively, these bushings being in vertical alignment with each other. Slidably mounted in said bushings is a shaft 16, the co-efficient of friction between said shaft and said bushings being as low as possible. A handle 20 at the top of the shaft permits of its being raised or lowered manually. At its lower end is a ram or pressure plate 21 which serves as one of the contact members contacting the material to be tested, the base 10 constituting the other of said contact members, the material being placed, when tested, between said ram and said base.

Intermediate the handle 20 and the ram 21 and, more particularly, between the cross members 12 and 13, is a platform 22 adjustably mounted on the shaft 16 by means of screw 23. This platform is adapted to carry weights 24. These weights are of standard construction and are provided with a slot to receive the shaft 16. If it be desired to divide a group of samples according to their relative compressibility, the weight used would be constant and the compressibility of each sample would be measured as hereinafter described. Another method of use would be to take a single sample and to apply different weights thereto as will hereinafter be described, until a desired compression is obtained.

Above the platform 22, but below the cross member 12, is a limiting arm 30 which is screwed into a threaded hole 31 in the shaft 16 or is otherwise affixed thereto. The arm, which is horizontally disposed, extends through a vertical slot 32 formed in the frame 11. It will be seen in Figs. 1 and 2 that this arm rests upon an adjustable stop screw 33 carried by a bracket 34 which is affixed to the frame 11 by means of the bolts 35. Screw 33 is adjustable on a line which lies parallel to the slot 32. It prevents downward movement of the arm 30 and hence of the shaft 16 and the ram 21 connected thereto beyond a predetermined point. A locking nut 36 locks said screw in place.

Figure 4:
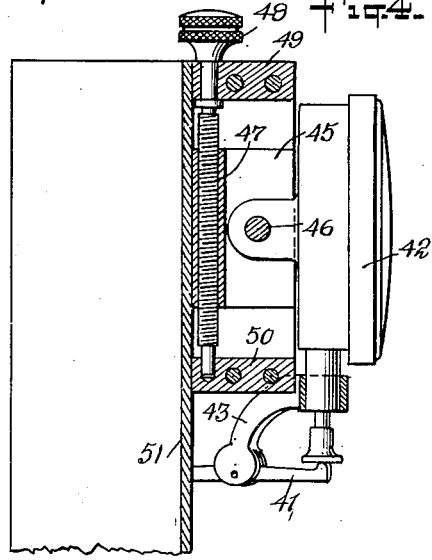
Fig. 4 is a fragmentary vertical section on the line 4—4 of Fig. 3.

Also affixed to the shaft 16, between the ram 21 and the lower cross member 13, is a stop collar 40. This collar engages one end of a lever 41 whose opposite end is engaged by a dial indicator 42 which registers vertical movement. The lever 41 is pivotally supported intermediate its two ends by means of a bracket 43 which is also connected to the dial indicator 42. No description will herein be given for the dial indicator for the reason that it is of standard construction and is used in many fields to measure linear movement of an object, in this case vertical movement of one end of the lever 41. The dial indicator 42 is pivotally mounted on a bracket or block 45 by means of pin 46. The block 45 is provided with a vertical bore 47 which is threaded to receive an adjusting screw 48, said adjusting screw being rotatably mounted on brackets 49 and 50 which are affixed to a frame 51 standing, like frame 11, on the base 10. It will be apparent, particularly in Fig. 4, that vertical movement of the dial indicator 42 may be effected by turning the screw 48.

The device may be operated as follows: The dial indicator is set for a piece of material of a particular size by placing a height gauge (of standard construction and not shown), between the ram 21 and the base 10 and adjusting the dial by means of the screw 48 accordingly. The stop or limiting screw 33 is now adjusted so that the arm 30 is made to rest thereon. In other words, no downward movement of the shaft 16 is permitted by this arm and screw construction when the height gauge is removed from under the ram 21. The dial indicator 42 should now be adjusted vertically by means of the screw 48 until it reads zero. A weight of predetermined amount is placed upon the platform 22. The shaft 16 is now raised by means of the handle 20 and the material to be tested is substituted for the height gauge on the base 10. The shaft 16 is now lowered until the arm 30 is brought into contact with the screw 33. At this point the reading on the dial should be identical with the reading at the time the height gauge was interposed between the ram 21 and the base 10. The material to be tested should also, at this point, be in contact both with the base 10 on which it rests and the ram 21. The screw 33 is now adjusted downwardly out of contact with the arm 30 thereby permitting a gradual downward movement of the shaft 16. When all downward movement of the shaft ceases, a reading is taken. The material may be left in the testing machine for further readings at predetermined intervals, for example, at hourly intervals or intervals of a day or a week or intervals of even longer duration.

The above method of operation will enable the operator to calculate the compressed height of the material being tested, in relation to the nominal free height of the material as represented by the height gauge used to set the machine. A second method of operating the machine would be to place the material between the ram 21 and the base 10, and to then adjust the height of the ram 21 to a light contact with the material by means of the limiting screw 33. The dial indicator 42 should then be adjusted vertically by means of the adjusting screw 48 until it reads zero. The limiting screw 33 is then adjusted downwardly to the limit of its range, and the ram 21 is allowed to descend. The amount of compression shown on the dial indicator would then be the true compression of the particular piece of material from its own free height, under the particular weight used.

A preferred embodiment only of this invention has hereinabove been described and it will be understood that variations and modifications may be incorporate therein without departing from the basic principles of the invention.

I claim:

1. A compression indicator comprising a platform for the material to be tested, a frame on said platform, a shaft mounted for free vertical movement in said frame, a pressure plate affixed to the bottom end of the shaft directly above the material platform, a handle for raising said shaft affixed to its top end, a limiting arm and a weight carrying support affixed to said shaft intermediate its ends, an adjustable limiting screw carried by the frame in line with the limiting arm for engagement therewith, a second frame on the material platform, a dial gauge for measuring and registering linear movement adjustably mounted in said second frame by means of a vertically adjustable screw means, a lever of the first class, one end of said lever engaging said dial gauge, and means connecting the opposite end of said lever to said pressure plate, whereby vertical movement of the pressure plate relative to the material platform is measured and registered by the dial gauge.

2. A compression indicator comprising a platform for the material to be tested, a ram vertically movable above said platform, means for raising said ram, adjustable limiting means for controlling downward movement of said ram, a gauge for measuring linear movement, an arm interconnecting said ram with said gauge, whereby the downward movement of said ram actuates said gauge, and an adjustable support for said gauge whereby its position relative to the interconnecting means may be changed so that actuation of the gauge by the downward movement of the ram may begin at any given position of the ram.

LESLIE V. ROBINSON.

REFERENCES CITED

The following references are of record in the file of this patent:

UNITED STATES PATENTS

| Number | Name | Date |
| --- | --- | --- |
| 1,763,400 | Lewis | June 10, 1930 |
| 1,839,093 | Geyer et al. | Dec. 29, 1931 |
| 1,846,048 | Desautels | Feb. 23, 1932 |
| 2,277,199 | Baxendale | Mar. 24, 1942 |
| 2,321,717 | Wallace | June 15, 1943 |
| 2,376,814 | Robinson | May 22, 1945 |